United States Patent
Bastianini

(10) Patent No.: US 9,410,826 B2
(45) Date of Patent: Aug. 9, 2016

(54) APPARATUS FOR INTERROGATING DISTRIBUTED STIMULATED BRILLOUIN SCATTERING OPTICAL FIBRE SENSORS USING A QUICKLY TUNEABLE BRILLOUIN RING LASER

(71) Applicant: Filippo Bastianini, Bologna (IT)

(72) Inventor: Filippo Bastianini, Bologna (IT)

(*) Notice: Subject to any disclaimer, the term of this patent is extended or adjusted under 35 U.S.C. 154(b) by 0 days.

(21) Appl. No.: 14/763,167

(22) PCT Filed: Mar. 18, 2014

(86) PCT No.: PCT/IT2014/000075
§ 371 (c)(1),
(2) Date: Jul. 24, 2015

(87) PCT Pub. No.: WO2014/155400
PCT Pub. Date: Oct. 2, 2014

(65) Prior Publication Data
US 2015/0377656 A1 Dec. 31, 2015

(30) Foreign Application Priority Data
Mar. 29, 2013 (IT) .............................. BO2013A0142

(51) Int. Cl.
*G01N 21/00* (2006.01)
*G01D 5/353* (2006.01)
(52) U.S. Cl.
CPC .................................. *G01D 5/35364* (2013.01)
(58) Field of Classification Search
CPC ........... G01D 5/353; G01J 1/04; H04B 10/06; H01S 3/083; G01B 9/02; G01B 11/16
See application file for complete search history.

(56) References Cited

U.S. PATENT DOCUMENTS

| 5,880,463 | A | * | 3/1999 | Uchiyama | G01B 11/18 250/227.14 |
|---|---|---|---|---|---|
| 7,272,160 | B1 | * | 9/2007 | Geng | H01S 3/302 372/29.011 |
| 7,283,216 | B1 | * | 10/2007 | Geng | G01D 5/35303 356/35.5 |
| 2004/0161250 | A1 | * | 8/2004 | Kozlowski | H04B 10/60 398/204 |
| 2008/0068586 | A1 | * | 3/2008 | Kishida | G01B 11/18 356/32 |

FOREIGN PATENT DOCUMENTS

GB 2442486 A 4/2004

* cited by examiner

*Primary Examiner* — Tarifur Chowdhury
*Assistant Examiner* — Jamil Ahmed
(74) *Attorney, Agent, or Firm* — Luoh J. Wu; Continent Patent Office LLP

(57) ABSTRACT

Device for measuring the distribution of strain and/or temperature along an optical fiber through the analysis of the stimulated Brillouin scattering, characterized by the fact that both the "optical pump" light from which the scattered energy is derived, and the "stimulus" or "probe" light that stimulates the scattering process are both derived by the same ring-type tuneable optical circuit that at the same type amplifies the amplitude of the "optical pump" light and generates, through a controlled Brillouin amplified scattering, the "probe" light having the spectrum linewidth required for the measurement needs and a wavelength shift with respect to the "optical pump" light that is accurately and quickly tuneable and fully adjustable within the range that is needed for interrogating a distributed optical fiber sensor.

10 Claims, 6 Drawing Sheets

APPARATUS FOR INTERROGATING DISTRIBUTED STIMULATED BRILLOUIN SCATTERING OPTICAL FIBRE SENSORS USING A QUICKLY TUNEABLE BRILLOUIN RING LASER

TECHNICAL FIELD OF THE INVENTION

The present invention concerns an apparatus intended to interrogate distributed optical fibre sensors by time-domain analysis of the changes of optical intensity induced by stimulated Brillouin scattering between optical "pump" light produced by a primary source and optical "probe" light produced from the primary source by means of a tuneable Brillouin ring-type circuit.

BACKGROUND OF THE INVENTION

The "Brillouin effect" is a non linear scattering phenomenon in which incident photons of light interact with mechanical vibrations of the medium inside which they propagates to get scattered with a wavelength shifted with respect to the original one, in which the wavelength shift is related to the electro-optical characteristics of the same medium and to the physical characteristics, among which mechanical strain and temperature, that can later such characteristics.

Due to the small entity of the Brillouin wavelength shift in conventional optical fibres, measuring such parameter requires techniques sophisticated and expensive to be implemented.

PRIOR ART

Several devices are known that use Brillouin scattering in an optical fibre in order to retrieve the distribution along its length of the temperature and/or the axial strain to which the same fiber is subject.

Various devices are known as "Brillouin Optical Time-Domain Reflectometers" (BOTDR) that use the spontaneous Brillouin scattering (sbs), by means of injecting optical "pump pulses" at one end of the sensing fibre and of analysing the Brillouin light spontaneously scattered.

The documents JP2001356070 (also disclosed as GB2368638B), GB2243210A, WO9827406A1, WO2007043432A1 and EP0887624A2 disclose devices that combine the time domain reflectometry principle with techniques capable to determine the wavelength shift of the backscattered photons in a sensing optical fibre due to spontaneous Brillouin scattering effects.

In the document WO9827406A1 the spectrum of Brillouin photons is analysed with a tuneable optical filter having bandwidth narrow enough, a part that in the practice is very fragile, big and very expensive.

In the documents JP2001356070, GB2243210A, EP0887624A2 it is suggested an heterodyne principle where in a balance electro-optical detector or in a photo-conductive mixer a beat is obtained between the backscattered Brillouin radiation and a portion of the "optical pump" radiation initially injected in the fibre, so that to obtain an electrical signal containing the information of the Brillouin spectrum.

The practical implementation of such solutions requires electro-optical detectors balanced and with very wide band that are very expensive.

The document EP0887624A2 in particular uses a light frequency converter device" to modify the wavelength of the "optical pump" radiation initially injected in the fibre. Using this trick, by changing the wavelength of "optical pumping" of a quantity close to that of the spontaneous Brillouin shift in the sensing fibre, is possible to reduce the bandwidth required for the balanced electro-optical detector, a condition that allows to reduce its cost even if slightly.

Are also known the documents JP2011232138A, JP2007240351A and JP2012063146A that disclose Brillouin reflectometers in which are used techniques of influencing the spectrum of the "optical pump" radiation by means of modulating the shape of the pulses.

Are also known the documents WO2006001071A1 and EP1760424A1 where it is described a Brillouin reflectometry technique with "pre-pumping" in which the sensing fibre, before the injection of the "optical pump" pulse, is pre-stimulated by means of injecting a low intensity radiation different from that of the "optical pumping" and characterized by a wavelength shift controlled so that it is set close to the one expected for the expected spontaneous Brillouin scattering.

Are known the documents JP2009080048, JP2009198389 and JP2010217029 in which are described reflectometers where the light backscattered by spontaneous Brillouin effect is analysed with an heterodyne system by mixing it with that backscattered by spontaneous Brillouin effect in a reference fibre at known and controlled temperature. Implementing such systems requires very expensive balanced electro-optical detectors since the efficiency of spontaneous Brillouin effect is scarce.

Are besides known various solutions also known as "Brillouin Optical Time Domain Analysers" (BOTDA) that uses the Stimulated Brillouin Scattering (SBS) in which it is obtained a counter-propagation between "optical pump" pulses that travels along the fibre and a "stimulus" or "probe" radiation that travels in opposite direction and is characterized by a wavelength shift controllable and known with respect to the "optical pump" radiation.

Are known the documents WO2012156978A1, WO2012084040A1 WO2007086357A1, JP2007033183, JP10048065, FR2710150, JP4077641 in which the "probe" radiation is obtained from the same source of "optical pumping" by means of an intensity modulator driven by a microwave signal with a frequency equal to that of the desired wavelength shift due to the generation of modulation side bands.

Are also known the documents JP4077641, EP0348235A2, EP1865289A2, EP0348235, DE102008019150A1 in which the "probe" radiation is obtained from a source different from that of the "optical pump" but that has a wavelength that is locked to that of the "optical pumping" by a feedback system capable to impose and keep constant a wavelength shift controllable and known between the two sources.

It is also known the document JP6273270 in which the "probe" radiation is obtained by means of a "light frequency conversion device" from the "optical pump" radiation that is produced by a device connected to the remote end of the sensing fibre and that comes our from the opposite end.

Are also known the documents JP2010008400A, JP2008286697A, JP2007178346A, US2008068586A1 where are described systems comprising more sources of radiation capable to produce techniques of "pre-pumping" somehow analogue to that described in the document WO2006001071A1.

Implementing the known solutions requires to use optical intensity modulators having very wide bandwidth and/or couples of sources of light radiation frequency locked the one with the other, parts that are delicate and are characterized by a very high cost.

Are known various systems capable to achieve amplified sources of light by stimulated emission of Brillouin radiation, also known as Brillouin ring LASERS.

The U.S. Pat. No. 4,107,628A, U.S. Pat. No. 4,530,097A, U.S. Pat. No. 5,323,415A, JP2005331727 and "Brillouin fiber laser with Raman amplification" (Ahmad H. et al., Opto-electronics and Advanced Materials 2-11, Nov. 2011) dispose devices where a "seed" radiation is injected in a closet optical circuit comprising a light pipe in which it can happen the Brillouin backscattering and means to amplify the backscattered radiation while instead selectively stopping the propagation of the "seed" radiation.

The documents "Multi-zone temperature sensor using a multi-wavelength Brillouin fiber ring laser" (Galindez C. A et al., Proc. SPIE Vol.7503 75030J-1) and "Temperature sensing based on a Brillouin fiber microwave generator" (Yang X. P. et al., Laser Phys. 23 (2013) 045104) disclose Brillouin ring LASERS in which discrete segments of the light pipe intended to allow the Brillouin backscattering and connected in the ring are kept at different temperatures and the temperature difference is observed in terms of the shift of the beat between the different wavelengths that circulates in the ring.

Known Brillouin ring LASERS are characterized by limitations in the spectral purity of the resonance radiation, limitations that are substantially due to the bandwidth characteristic for the stimulated Brillouin emission that is at the origin of their operation.

Said limitations make the known Brillouin ring LASER devices non perfectly suited to be used in applications where the radiation that they produce is used for a detailed study of the Brillouin scattering spectrum in other propagation media.

Known Brillouin ring LASER devices are besides characterized by technical limitations due to the continuous recirculation of the oscillation radiation, recirculation that during the phases of tuning of the of the oscillation wavelength keeps trace of the wavelengths previously tuned for a certain interval of time, thus causing a transitory alteration of the oscillation spectrum that quenches slowly during the time (tuning distortion).

In the known devices therefore any eventual tuning must be followed by a delay phase before the conditions are reached in which is reached the spectral purity that is required for the scopes of interrogating Brillouin distributed sensors.

It is known the U.S. Pat. No. 5,880,463A in which is used a ring optical circuit that comprises the sensing fibre and in which pulses of light backscattered for spontaneous Brillouin effect from an initial isolated pulse of "optical pumping" in order to be analysed in a heterodyne system by beating with the "optical pump" source the wavelength of which has been properly changed by a "light frequency conversion device", system that retains the limitations of manufacturing and high cost that come with the other known devices.

It is known the U.S. Pat. No. 7,283,216B1 in which the radiation backscattered by spontaneous Brillouin effect by a pulse of "optical pump" radiation injected at one end of the sensing fibre is analysed using an heterodyne principle with a beat between the same spontaneous scattering and the radiation produced starting from that of "optical pumping" by means of a ring Brillouin LASER the wavelength of which is locked to that of the "optical pump" source with a frequency shift known and stable due to the action of an active piezoelectric feedback system. The said solution, that is conceptually assimilable to that described in the document EP0887624A2, retains the performance limitations that characterize the solutions based on spontaneous scattering and remains characterized by the high manufacturing costs that characterize the heterodyne systems.

Are not known solutions comprising ring Brillouin LASERS to achieve systems based on the stimulated Brillouin scattering or that can breakthrough the performance limitations and cut the level of cost common to known devices.

In addition are not known solutions comprising tuneable Brillouin ring LASERS in which there are devices to allow a fast recovery of the characteristics of spectral purity of oscillation.

DISCLOSURE OF THE INVENTION

The main scope of the present invention is that of achieving an apparatus for interrogating optical fibre sensors based on the stimulated Brillouin scattering that could overcome the performance limitations and break down the level of cost commons to the known devices. A further scope of the present invention is that of achieving an interrogation system for optical fibre sensors based on stimulated Brillouin scattering in which the "stimulus" or "probe" radiation could be produced in a cheap and efficient way and with a wavelength that is intrinsically locked to the wavelength of the "optical pump" radiation with a shift between the two wavelengths that is known and controllable with accuracy, and in which the "probe" radiation could be produced without using microwave-driven optical modulators, and/or optical side-band suppression filters, and/or multiple LASER sources controlled by optical Phase-Locked-Loop circuits.

In a first broad independent aspect the present invention provides an apparatus for interrogating optical fibre sensors based on the stimulated Brillouin scattering between optical "pump" radiation and "stimulus" or "probe" radiation in which one of the two radiations is produced by one primary LASER source while the other radiation is produced by means of spontaneous and stimulated Brillouin scattering inside a ring-type Brillouin resonator circuit that is fed by the same radiation produced by the primary LASER source.

In a first subsidiary aspect the present invention provides an apparatus where both the optical "pump" and "stimulus" radiations can be derived from the same ring-type Brillouin resonator circuit.

In a second subsidiary aspect the present invention provides an apparatus where the radiation produced inside the ring-type Brillouin resonator is intrinsically locked to the wavelength of the primary LASER source with a wavelength shift that can be accurately controlled by means of controlling the temperature and/or strain conditions of at least one part of the ring-type optical circuit.

In a third subsidiary aspect the present invention provides an apparatus comprising one purging system for the ring-type Brillouin resonator capable to quench the distortion of the spectrum of the radiation produced by the same resonator in example consequent with a change of the tuning of the wavelength shift.

The previous scopes are fulfilled by the present invention since it discloses one apparatus for interrogating optical fibre sensors based on the stimulated Brillouin scattering that is characterized by:

the fact of not requiring any microwave-driven optical modulator, optical side-band suppression filter or optical Phase-Locked-Loop circuit between multiple LASER sources;

the fact of producing optical "pump" and "stimulus" radiation having a wavelength shift intrinsically locked the one to the other;

the fact of having a wavelength shift that can be tuned with accuracy;

the fact of having a system for quenching the distortion of the spectrum consequent to the tuning process.

BRIEF DESCRIPTION OF DRAWINGS

A full and enabling disclosure of the present invention, including the best mode thereof, directed to one of ordinary skill in the art, is set forth in the specifications, which makes reference to the appended figures, in which.

DETAILED DESCRIPTION OF THE PREFERRED EMBODIMENTS

Selected combinations of aspects of the disclosed technology correspond to a plurality of different embodiments of the present invention. It should be noted that each of the exemplary embodiments presented and discussed herein should not insinuate limitations of the present subject matter. Features or steps described as part of one embodiment may be used in combination with aspects of another embodiment to yield yet further embodiments.

Additionally, certain features may be interchanged with similar devices of features not expressly mentioned which perform the same or similar function.

The invention will now be illustrated referring to the attached figures that represent preferred embodiments of the same not binding with respect to the protection purposes of the present document.

Figure 1:
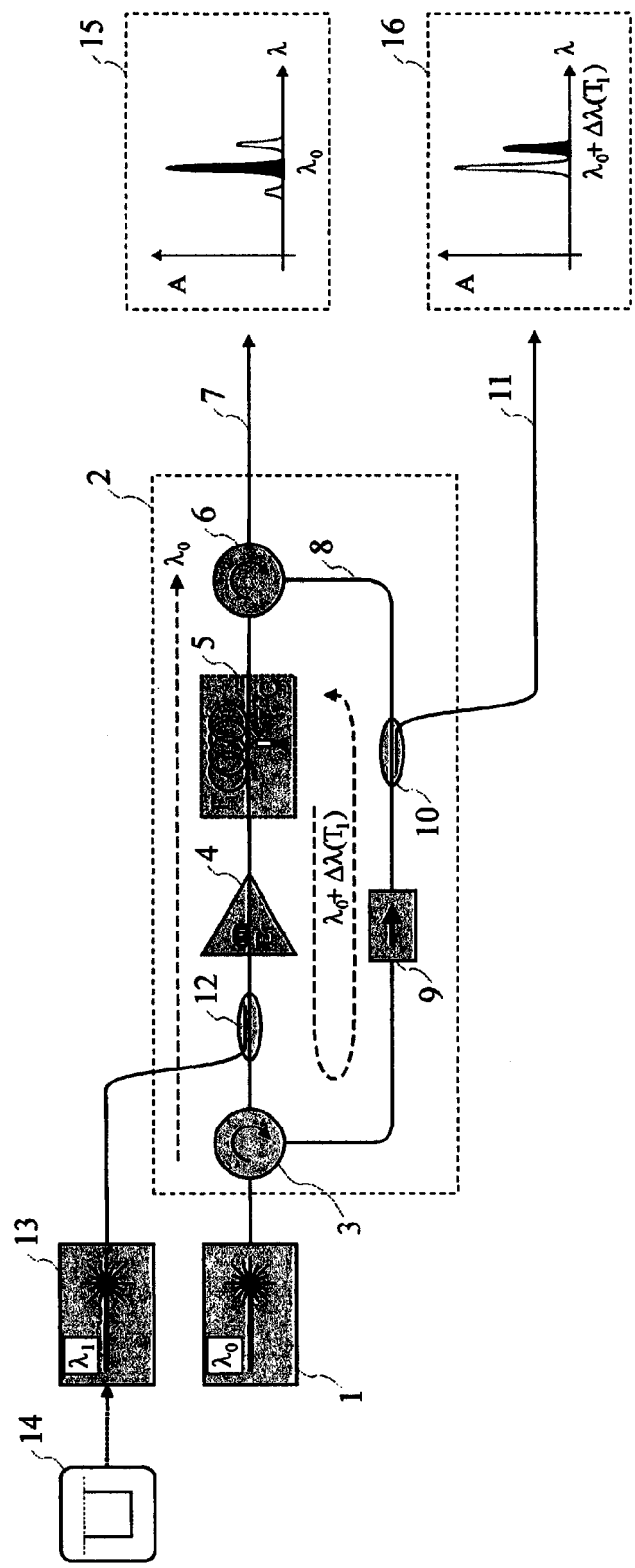
FIG. 1 discloses a partial schematic representation, non-limiting, of an embodiment of a ring-type Brillouin resonator optical circuit according to the present invention.

FIG. 1 discloses a non-limiting partial schematic representation of a ring-type Brillouin resonator circuit according to the present invention that accepts an input optical radiation produced by a primary LASER source of wavelength $\lambda_0$ and produces an output radiation of wavelength $\lambda_0 + \Delta\lambda(T,\epsilon)$ by means of spontaneous and stimulated Brillouin scattering inside a section of optical fibre that is part of the ring optical circuit, where the wavelength shift $\Delta\lambda(T,\epsilon)$ is accurately controlled by controlling the temperature and/or strain of the same section of optical fibre.

The apparatus disclosed in FIG. 1 comprises:
one source of optical radiation (1) characterized by a wavelength $\lambda_0$ and by a spectral linewidth non bigger than the width of the spectrum gain bandwidth of the Brillouin scattering in the sensing fibre, and directional coupling means (3), such as for example an optical circulator or directional coupler, suitable to inject the said radiation into a ring-type optical circuit (2) with a certain first direction of travel, and means of optical amplification (4), eventually present in the ring (2), capable to amplify the intensity of the optical radiations, and a section constituted by a light waveguide (5) capable to behave as a Brillouin gain medium and having suitable length, and that is kept in uniform conditions of temperature T and strain $\epsilon$ by means of one active system capable to arbitrarily control at least one between the temperature T and the strain $\epsilon$, and optical routing media (6, 8, 9, 10), eventually directional, connected so that the Brillouin light, both spontaneous and stimulated, having wavelength $\lambda_0 + \Delta\lambda(T,\epsilon)$ and backward scattered in the light waveguide (5) is in part routed back into the same light waveguide (5) keeping a direction of travel opposite to the first direction of travel of the optical radiation that is injected into the ring (2) from the outside, and is in part extracted from the ring and made available at one first output port (11).

When the optical circuit of FIG. 1 is fed by the injection of the radiation of wavelength $\lambda_0$ from the source (1), the injected light passes through the light waveguide (5) with an amplitude suitable to scatter spontaneous Brillouin photons having wavelength $\lambda_0 + \Delta\lambda(T,\epsilon)$, that is shifted with respect to the injected light of a quantity $\Delta\lambda$ that is controlled by the conditions of temperature T and strain $\epsilon$ at which the light waveguide (5) is kept. The backscattered faction of the Brillouin photons is selectively routed back in the same light waveguide (5) through the closed structure of the ring circuit, keeping a direction of travel opposite to that of the optical radiation that is injected into the ring from the outside, thus obtaining a stimulated Brillouin amplification of the light having wavelength $\lambda_0 + \Delta\lambda(T,\epsilon)$.

The routing media (6, 8, 9, 10) in the ring type circuit might be also eventually arranged so that the depleted radiation of wavelength $\lambda_0$, after having completed its "optical Brillouin pump" function in the light waveguide (5), is selectively extracted out from the ring circuit (2), for example by means of directional routing means (6), and made available at one second output port (7). Eventually, the said routing means (6) could be suitable to extract, in addition to the said depleted radiation of wavelength $\lambda_0$, also the forward scattered fraction of the Brillouin photons of wavelength $\lambda_0 \pm \Delta\lambda(T,\epsilon)$ produced in the light waveguide (5), so that at the second output port (7) is made available an optical radiation having a stronger spectral component of wavelength $\lambda_0$ accompanied by weaker components of wavelength $\lambda_0 + \Delta\lambda$ and eventually $\lambda_0 - \Delta\lambda$ capable to behave as Brillouin scattering pre-seed.

The ring-type circuit (2) is arranged so that the radiation of wavelength $\lambda_0$ can not recirculate in the ring-type circuit (2); while the backscattered Brillouin Stokes radiation that has wavelength $\lambda_0 + \Delta\lambda(T,\epsilon)$ is free to recirculate continuously in the ring-type circuit (2) getting selectively amplified in the light waveguide (5) that performs as the Brillouin gain medium.

By a suitable choice of the length of the light waveguide (5), and by suitably adjusting the power of the radiation of wavelength $\lambda_0$ injected into the ring circuit (2) and the gain of the optical amplifier (4) eventually present, it is possible to compensate the losses due to the attenuation in the ring-type optical circuit (2) and to the fraction of optical counter-propagating radiation extracted from the same circuit (2), achieving a self-sustaining oscillator with wavelength $\lambda_0+\Delta\lambda(T,\epsilon)$ that is also known as Brillouin ring LASER.

The system may also comprise, even if not necessarily for the protection purposes of the present document, at least one mean of selection of the direction of propagation (9), such as for example an optical isolator, inserted in the feedback arm (8) of the ring-type circuit (2), with the scope of avoiding any possibility of recirculation of the forward propagating radiation of wavelength $\lambda_0$.

The system may also comprise coupling means (10), such as for example a coupler or diverter, suitable to pick-up a fraction, eventually adjustable, of the radiation with wavelength $\lambda_0+\Delta\lambda(T,\epsilon)$ at which the Brillouin ring LASER auto-oscillates and to route it in a second output arm (11).

Suitably, even if not necessarily for the protection purposes of the present document, the pick-up coupler (10) will be dislocated along the feedback arm (8) of the ring circuit (2) and/or could take advantage of the characteristics of directionality of its own optical coupling so that to be able to pick up the radiation that propagates only in the direction opposite to that of the radiation of wavelength $\lambda_0$ that is injected in the ring from the outside, and to pick up the said radiation from a point of the circuit (2) where the presence of the radiation of wavelength $\lambda_0$ is by force of circumstances minimum.

Suitably, even if not necessarily for the protection purposes of the present document, the means of optical amplification (4), eventually present, will be of bi-directional type, that is they will be characterized by the capability of amplifying the radiations in the band of wavelength of interest independently from the direction of propagation with which they go through the means of optical amplification (4).

The said means of optical amplification (4) could also be of non-bidirectional type, in such a case they would be however displaced in a proper number and proper way to amplify at least one of the radiations propagating along at least part of the circuit (2).

In case all the means of optical amplification (4) would not be of bi-directional type and it is desired to obtain also an amplification of both the radiation of wavelength $\lambda_0$ that is injected in the ring from the outside, and of the radiation wavelength $\lambda_0+\Delta\lambda(T,\epsilon)$ that is generated within the ring circuit (2) it may be present multiple separate means of optical amplification and, in case at least one of the said means (4) would be enough transparent to the radiation that go through it in the direction opposite to that of amplification, the means of amplification could be dislocated within the ring-type circuit (2); differently, in case none of the means of amplification (4) would be enough transparent to the radiation that go through it in the direction opposite to that of amplification, the means of amplification (4) could be dislocated at least partly outside of the ring-type circuit (2).

Suitably, even if not necessarily for the protection purposes of the present document, the means of amplification (4) could comprise at least one amplifier with Erbium-doped optical fibre (EDFA, Erbium-Doped Fiber Amplifier) or other element.

Suitably, even if not necessarily for the protection purposes of the present document, the means of amplification (4) could comprise at least one optical amplifier by stimulated Raman emission.

In case the means of amplification (4) would comprise an EDFA and/or Raman amplifier, it could suitably present at least one source (13) capable to produce at least one radiation with wavelength $\lambda_1$ suitable for "optical pumping" the means of amplification (4), and it could also be suitably present at least one mean of wavelength-selective coupling (12) capable to inject in the optical circuit the said radiation with wavelength $\lambda_1$ in a way so that it can efficiently reach the scope of "optical pumping" of the said amplification means (4).

Suitably, even if not necessarily for the protection purposes of the present document, the means of amplification (4) could comprise at least one Semiconductor Optical Amplifier (SOA).

As it has been already mentioned above the apparatus subject of this document comprises also a device suitable to arbitrarily tune the wavelength shift $\Delta\lambda$ a within the limits required by the scope of analysis fixed in advance and keeping a spectrum linewidth of the radiation of wavelength $\lambda_0+\Delta\lambda$ suitable for the same scope.

The spectral characteristics of the Brillouin ring LASER are defined by the intrinsic characteristics of the light pipe (5) and by the uniformity of the physical parameters that characterize the same medium, such as its temperature and strain distribution. In order to ensure a suitable spectrum purity, in the apparatus the light pipe (5) could comprise at least one suitable optical fibre kept in suitably uniform conditions of temperature and strain. Suitably, even if not necessarily for the protection purposes of the present document, the light pipe (5) will be dislocated in the space so that to avoid curved sections, or sections having a radius of curvature below a suitably large value. Suitably, even if not necessarily for the protection purposes of the present document, the light pipe (5) could be, at least in part, be constituted by a single-mode optical fibre characterized by large Numeric Aperture (NA), that is a mode field diameter (MFD) reduced, with the scope of obtaining an higher purity of the Brillouin scattering spectrum.

The light pipe (5) could in particular comprise, even if not necessarily for the protection purposes of the present document, a single-mode fibre with MFD not exceeding 5.3 µm at 1550 nm and external cladding diameter not exceeding 80 µm.

Suitably, even if not necessarily for the protection purposes of the present document, the light pipe (5) could at least in part be constituted by an optical fibre having a core diameter equal to 6.4 µm and cladding diameter equal to 80 µm.

Suitably, even if not necessarily for the protection purposes of the present document, the light pipe (5) could at least in part be constituted by an optical fibre having a core diameter equal to 4.2 µm and cladding diameter equal to 125 µm and/or 80 µm and/or 50 µm.

Suitably, even if not necessarily for the protection purposes of the present document, the light pipe (5) could at least in part be constituted by an optical fibre having specific non-linear optical behaviour, for example by means of concentration profile of dopants, core/clad geometry, photonic crystal fibre or other characteristics.

Suitably, even if not necessarily for the protection purposes of the present document, the light pipe (5) could at least in part have a profile of the doping that controls its refractive index so that to characterize a shift of the Brillouin wavelength different from that that characterize the conventional optical fibres that are commercially available and/or are used as sensing fibres, in the same conditions of temperature and strain, and so that it can be moved to the value of the Brillouin shift for the sensing fibre by bringing the light pipe (5) in a condition of temperature and deformation more easily obtainable in the environmental physical conditions that are imposed to the interrogation apparatus.

Suitably, even if not necessarily for the protection purposes of the present document, the light pipe (5) could be at least in part constituted by an optical fibre having a profile of concentration of the doping suitable to surround the core of the same fibre with a concentric layer ("trench") characterized by a refractive index reduced with respect to that of the core and of the cladding.

Suitably, even if not necessarily for the protection purposes of the present document, the light pipe (5) would be at the same time characterized by a reduced MDF with respect to that of the conventional fibres and by a profile of concentration of the doping suitable to surround the core of the same fibre with at least one concentric layer ("trench") of the type described.

The possible use of an optical fibre having a reduced core diameter to embody at least part of the light pipe (5) is innovative since it allows to:
  reduce the bandwidth of the Brillouin emission spectrum that could result from displacing the light pipe (5) along curved paths due to the mechanical strains that are induced by such displacement in the portion of the fibre where the propagation of the radiation is confined; and
  increment the efficiency of the Brillouin scattering thanks to the achievement of higher levels of optical power densities, in the same conditions of injected optical power; and
  improves the spectral purity of the Brillouin scattering that characterizes the same fibre.

Suitably, even if not necessarily for the protection purposes of the present document, the light pipe (5) could have at least in part properties so that it can at the same time achieve the functionalities of amplification of the radiations that go through it and the functionalities of medium of propagation with favourable conditions to the occurrence of Brillouin scattering phenomena spontaneous and eventually stimulated. With the abovementioned scope, the light pipe (5) could for example be characterized by an added Erbium doping or other element with the aim of behave also as an amplification medium. For the same scope the light pipe (5) could also be subject to the propagation of one or more further light radiations with wavelength different from all the listed ones [$\lambda_0$, $\lambda_0+\Delta\lambda$, $\lambda_0-\Delta\lambda$] and selected so that it can act as an "optical pumping" for the medium of optical gain.

With the scope of achieving effects of optical amplification in the optical ring-type circuit (2) in general, and in the light pipe (5) in particular, they could be, even if not necessarily for the protection purposes of the present document, injected radiations suitable to act as "optical pumping" for Erbium-doped fiber amplifiers, such as radiations with wavelength around 980 nm and/or radiations with wavelength around 1480 nm; and/or could be injected radiations suitable to act as "optical pumping" for an amplification by stimulated Raman scattering, such as for example, in the case it had been chosen a value for the wavelength $\lambda_0$ around 1550 nm, radiations with wavelength comprised between 1430 and 1490 nm.

The apparatus subject of the present document will also necessarily comprise specific means to tune the ring Brillouin LASER that is embodied in the optical circuit (2), that is to adjust in a controlled way the shift $\Delta\lambda$ of the wavelength $\lambda_0+\Delta\lambda$ of its own oscillation with respect to the wavelength $\lambda_0$ of the "seeding" radiation injected in the ring-type circuit from the outside. The abovementioned means could comprise at least one thermostatic device suitable to set a known condition of temperature to al least part of the light pipe (5). The said thermostatic device could comprise at least one heat pump coupled to the light pipe (5), at least one temperature sensor and at least one feedback regulation system suitable to control the thermal power exchanged by the heat pump so that to keep the temperature of the light pipe (5) at the desired value of temperature.

The said thermostatic device could furthermore comprise at least one system of heat insulation of the thermally-stabilised section and/or means to increase the thermal inertia of the thermally-stabilised section and/or means to improve the maximum temperature uniformity of the thermally-stabilised section and/or at least one Peltier-type thermoelectric heat pump.

Suitably, even if not necessarily for the protection purposes of the present document, the light pipe (5) could reside inside a fluid possibly subject to circulation flow so that to obtain an optimal homogeneity of the conditions of temperature of the same.

The apparatus subject of the present document could also eventually comprise specific means to reduce the time of "tuning distortion" of the Brillouin ring LASER that is embodied in the optical circuit (2) and to allow a very fast achieving of the optimal conditions of spectral purity after any tuning of the LASER that is obtained by changing the conditions of strain and/or temperature of the light pipe (5).

For this scope the apparatus subject to the present document could for example, even if not necessarily to the protection scope of the present document, comprise one controllable optical attenuator, properly dislocated in the ring circuit (2) so that to be able to introduce an additional optical attenuation at least in the direction of propagation of the oscillation of the Brillouin LASER inside the ring and controlled in a way that, each time the Brillouin LASER is tuned changing the conditions of temperature and/or strain of the light pipe (5), an higher level of optical attenuation is transiently introduced to quench more quickly the possible spectral components due to the residual of the oscillations in the phases preceding the tuning.

For the same scope the apparatus subject to the present document could for example also comprise, even if not necessarily to the protection scope of the present document, means suitable to reduce or momentarily null the gain of the means of optical amplification (4) that help to sustain the self-oscillation of the Brillouin LASER in the ring-type circuit (2); for example by means of a zeroing or "blanking" device (14) that can adjust or interrupt the electrical current that sustains the "optical pumping" for the media of optical amplification (4) directly (such as for example in case the said means would include at least one SOA) and/or indirectly by controlling at least one of the sources (13) of "optical pumping" radiations of the amplifying means (4) (such as for example one of the LASERs of "pumping" for Raman or Erbium doped fiber amplifiers in case the amplification means would comprise at least one of the abovementioned ones).

The device of FIG. 1 could be used to obtain the "pump" and "stimulus" radiations that are required to interrogate a distributed fiber optic sensor based on stimulated Brillouin effect.

For this scope the apparatus will further comprise at least one mean suitable to interrupt the propagation and/or control the amplitude of at least one of the two radiations so that to generate pulses having time duration limited and known; it will also comprise at least one mean suitable to route the said pulses in a first direction of travel inside the sensing fibre and to route, directly and/or indirectly, the other different radiation in the opposite direction of travel in the same sensing fibre; it will also comprise at least one mean suitable to convert into an electrical signal the amplitude of the latter radiation after that it has completed its own propagation along the sensing fibre; and it will comprise at the end means suitable to acquire, covert, record and analyse the said electrical signal as a function of the delay time from the moment of creation of the said pulses and suitable to reiterate this process while properly changing the tuning of the Brillouin ring LASER.

Figure 2:
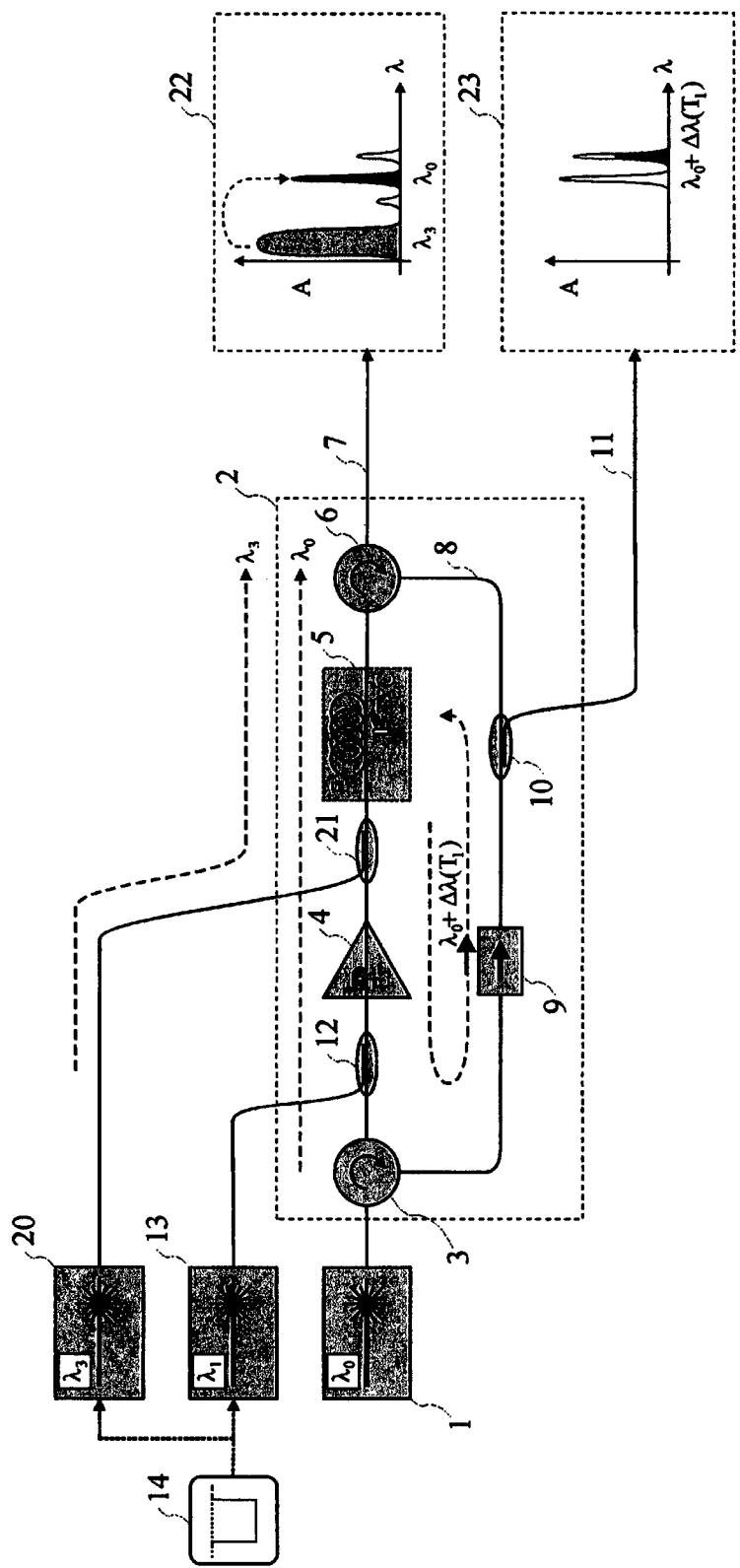
FIG. 2 illustrates a partial schematic representation, non-limiting, of an embodiment conceptually analogue to that of FIG. 1 but having a variety of means of optical amplification possibly also capable to achieve their function outside the ring-type optical circuit.

FIG. 2 discloses a non-limiting partial schematic representation of a preferred embodiment of an apparatus according to the present invention conceptually analogue to that of FIG. 1 but having a variety of means of optical amplification possibly capable to achieve their function also outside the ring-type optical circuit (2). In particular the device of FIG. 2 comprises a further source (20) of pumping radiation of wavelength $\lambda_3$ suitable to act as "optical pumping" for the stimulated Raman scattering in the optical fibre that is used to embody the light pipe (5) and possibly also in the optical fibre used as a sensor. The source (20), that could be also possibly controlled by the "blanking" system (14) in a similar way to what has been already described for the source (13), is injected in a suitable point of the ring-type optical circuit (2) by means of a proper wavelength selective coupler (21) so that it can passes through at least part of the light pipe (5) inducing the amplification of at least one between the radiations of wavelength $\lambda_0$ and $\lambda_0+\Delta\lambda$ that also flow in the optical circuit (2).

Suitably, even if not necessarily for the protection purposes of the present document, the optical routing means (6, 10) could extract the radiation of wavelength $\lambda_3$ out from the ring-type optical circuit and route the same into one of the output ports (7, 11) so that to inject it into sensing fibre and obtain a stimulated Raman amplification along the sensing fibre in order to compensate the progressive depletion of the "pump" radiation and allow to interrogate sensing fibres with larger length.

Figure 3:
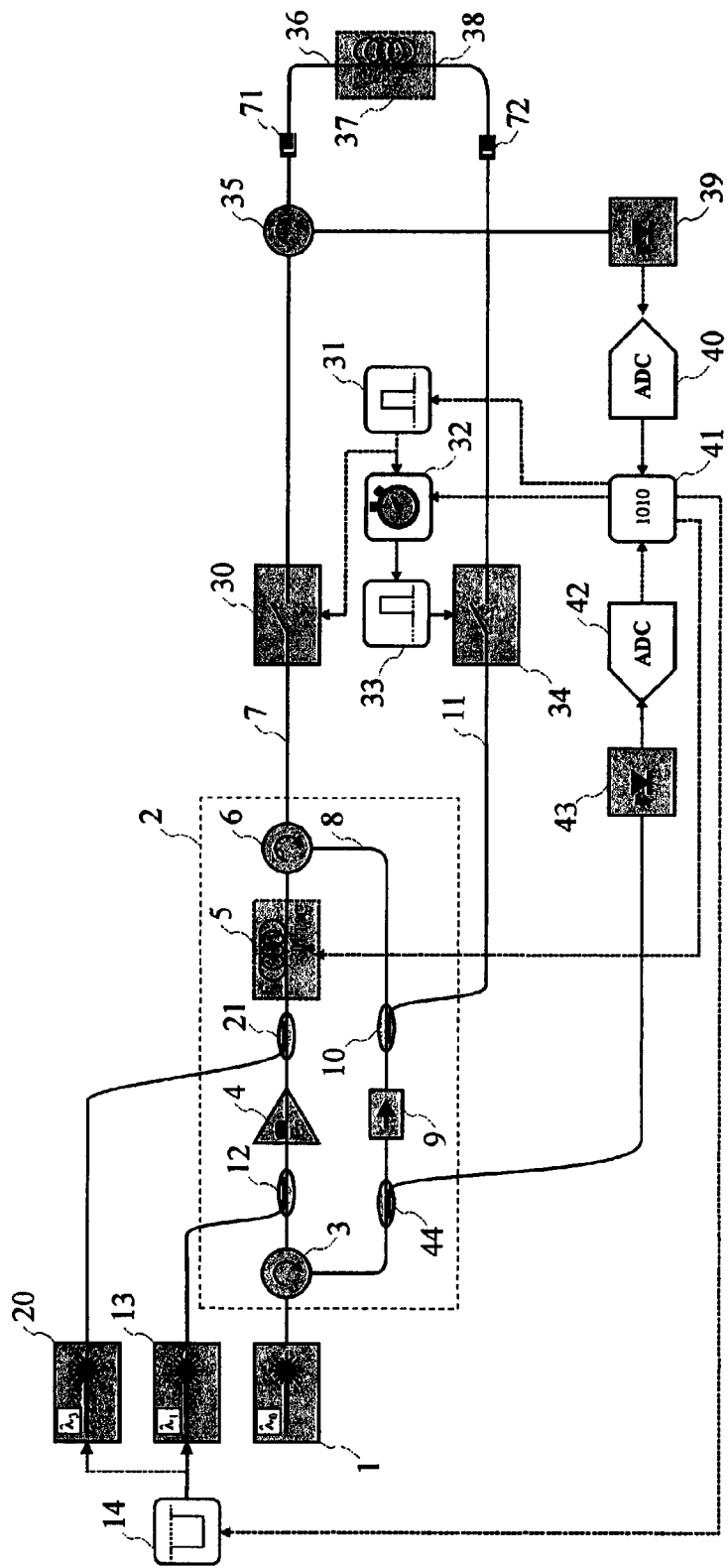
FIG. 3 illustrates a schematic representation, non-limiting, of an embodiment of a BOTDA apparatus according to the present invention characterized by a "transmission-type" connection of the sensing fibre.

FIG. 3 discloses a non-limiting partial schematic representation of a preferred embodiment of a BOTDA apparatus according to the present invention characterized by a "transmission type" connection of the sensing fibre. In addition to what has been already described in the above, the embodiment of FIG. 3 comprises at least one mean to generate optical pulses (3) driven by a pulse generator (31) and capable to induce pulses having a defined time duration from the radiation suitable to work as a "Brillouin pump" and obtained from the source (1) or from one of the output ports (7) of the ring-type optical circuit (2). The device also comprises at least one directional coupling mean (35) suitable to route the said pulses into one first end (36) of the sensing fibre (37) (not necessarily part of the apparatus subject of the present invention) that is coupled the apparatus through optical connectors (71, 72). The device furthermore comprises at least one mean to route the radiation suitable to work as a "Brillouin stimulus", obtained from the ring-type optical circuit (2), into the opposite end (38) of the sensing fibre (37). Suitably, even if not necessarily for the protection purposes of the present document, the apparatus could also comprise further means to generate optical pulses (34) driven by a pulse generator (33) synchronized to the generator (31) through a programmable delay generator (32), also along the arm (11) from which is derived the radiation of "Brillouin stimulus".

The means for generating optical pulses (30) and/or (34) could comprise, even if not necessarily for the scope of protection of the present document, at least one optical intensity modulator and/or at least one SOA (Semiconductor Optical Amplifier) optimized for pulsed operation.

The apparatus furthermore comprises at least one optoelectronic detector (39) connected to the directional coupler (35) so that to generate an electrical signal proportional to the intensity of the light radiation that comes out from the sensing fibre (37) according to the direction of propagation from the end (38) where the "Brillouin stimulus" is injected towards the opposite end (36) where the "Brillouin pump" is injected.

Suitably, even if not necessarily for the protection purposes of the present document, the detector (39) could be an avalanche photodiode in which the bias conditions required to obtain the maximum sensitivity are driven in a suitably synchronized way with respect to the pulse generator (31).

The apparatus could also comprise, even if not necessarily for the protection purposes of the present document, further optoelectronic detectors (43) suitable to monitor the actual intensity of the "Brillouin stimulus" radiation that is injected in the sensing fibre (37) with the scope of normalizing the measurement achieved by the detector (39), being the said detectors (43) lighted by a fraction of the "Brillouin stimulus" radiation suitable derived from the ring-type optical circuit (2) or from the arm (11) by means of optical coupling means (44).

The apparatus also comprises at least one mean (40, 42) of conversion of the electrical signals from the detectors (39, 43) into digital information and comprises also means of control and computation (41) suitable to:
 drive the tuning of the Brillouin ring LASER by means of setting the conditions of temperature and/or strain of the light pipe (5);
 drive the "blanking" device (14) to restore the optical spectral conditions of the Brillouin ring LASER after each tuning;
 control and synchronize the pulse generator (31);
 control the programmable delay generator (32) and the pulse generator (33) possibly present;
 collect the information from the converters (40, 42);
 interface with an operator and/or a communication channel in general in order to exchange information and instructions.

The said means of control and computation (41) will furthermore be able to interrogate the sensing fibre (37) to retrieve the distribution of the wavelength shift of the stimulated Brillouin scattering along the length of the same sensing fibre (37) according to an algorithm where:
 a) the Brillouin ring LASER is tuned on a first initial wavelength $\lambda 0+\Delta\lambda_{(1)}$ of the "Brillouin stimulus";
 b) the Brillouin ring LASER is purged from possible detuning momentarily activating the "blanking" system (14);
 c) the pulse generator (31) is activated to create a pulse of "Brillouin pumping" having suitable shape and duration;
 d) if required, the pulse generator (33) and the delay generator (32) are programmed to generate a pulse of "Brillouin stimulus" having suitable shape, duration and delay of synchronization;
 e) the time-history of the intensity of the radiation of "Brillouin stimulus" is collected through the detector (39) and possibly the detector (43), or, in case also the "Brillouin stimulus" is pulsed, the instant intensity of the stimulus pulse is measured and the points from c) to e) are repeated varying the synchronization delay of the generator (32) so that the intensity-versus-delay data is retrieved;
 f) The Brillouin ring laser is tuned to a new wavelength $\lambda 0+\Delta\lambda_{(n)}$ of the "Brillouin stimulus" shifted from the previous one of a suitable quantity;
 g) the operations of the points from b) to f) are repeated until it is completed the collection of data of the point e) within all the interval of interest of the "Brillouin stimulus" wavelength;
 h) the data collected at the different wavelengths of the "Brillouin stimulus" are interpolated and analysed with respect to the same delay time with respect to the pulse generation of the "Brillouin pump" in order to locate the wavelength at which it is observed the maximum attenuation or amplification of the intensity of the radiation of "Brillouin stimulus" due to the stimulated Brillouin scattering happening in the section of sensing fibre to which the data are referable.

The said means of control and computation (41) could, in addition, even if not necessarily for the protection purposes of the present document, implement techniques of noise reduction by means of multiple averaging of the measurement cycles and/or correct the elaborated data on the basis of other information collected from the same system and/or in points along the measurement circuit where are displaced conditions of temperature and/or strains measurable or anyhow known.

The said means of control and computation (41) could, in addition, even if not necessarily for the protection purposes of the present document, implement techniques of "threshold" detection in which the analysis of the Brillouin scattering in the sensing fibre (37) is limited to a more restricted interval of the wavelengths of the Brillouin stimulus with the scope of producing, in an measurement time extremely reduced, an information only qualitative on just the crossing of the threshold value of temperature and or strain along the same fibre.

Figure 4:
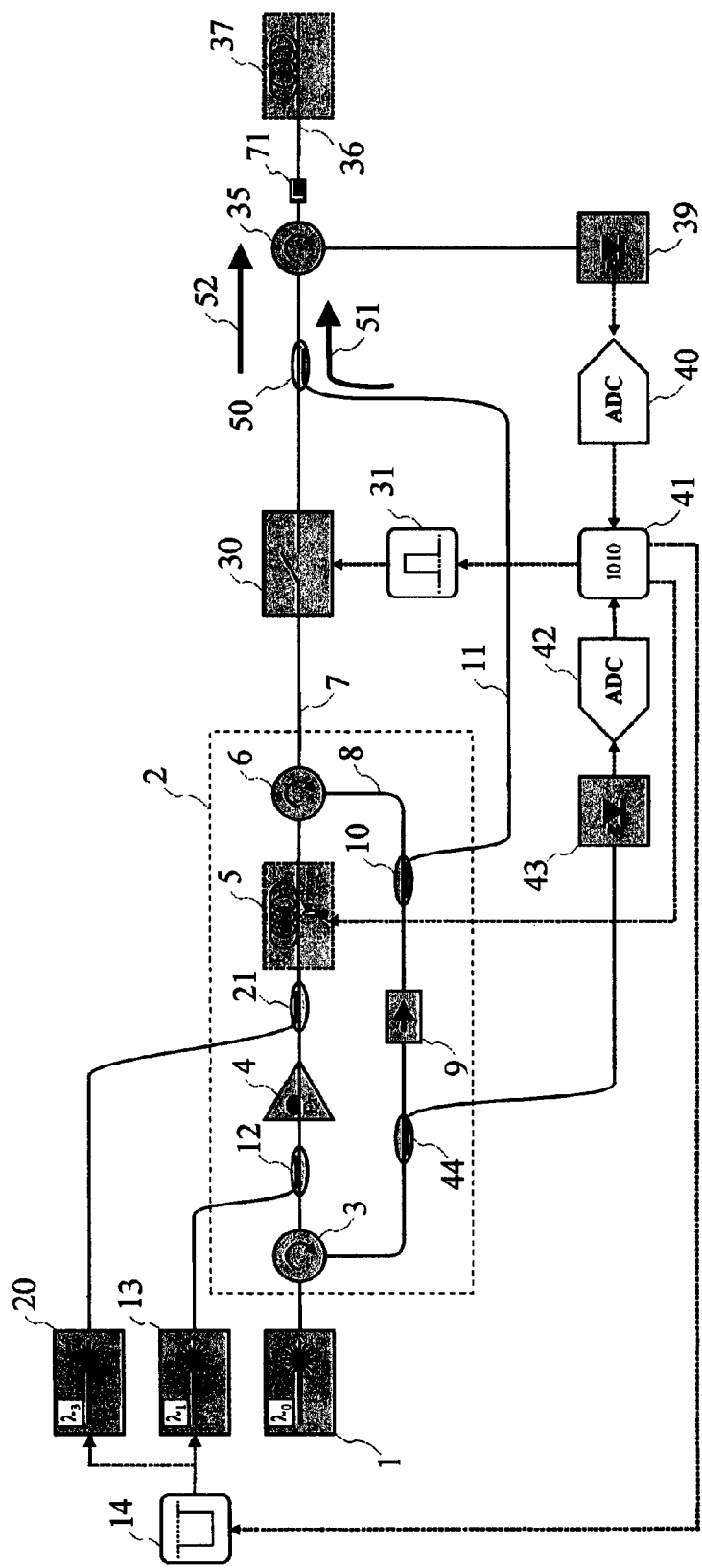
FIG. 4 illustrates a schematic representation, non-limiting, of an embodiment of a BOTDA apparatus according to the present invention characterized by a "reflection-type" connection of the sensing fibre.

FIG. 4 discloses a non-limiting partial schematic representation of a preferred embodiment of a BOTDA apparatus according to the present invention characterized by a "reflection type" connection of the sensing fibre.

The apparatus of FIG. 4 is analogous to that described in the above for the production of the "Brillouin pump" and "Brillouin stimulus" radiations, the generation of pulses of with suitable shape and duration, the optical routing system to inject the "Brillouin pump" pulses at one end (36) of the measurement fibre (37) and the optoelectronic device (39) to detect the intensity of the "Brillouin stimulus" radiation collected out from the same end (36) of the measurement fibre (37) at which the "Brillouin pump" pulse is injected, and the system of control and computation (41) and the governing principle of the same. Differently from what is for the device of FIG. 3, in the embodiment of FIG. 4 the "Brillouin stimulus" radiation is injected into the same end (36) of the measurement fibre (37) with the same direction of propagation of the "Brillouin pump". In the measurement fibre (37) it is then obtained a counter-propagation of the "pump" and "stimulus" radiation though the random sources of elastic Rayleigh scattering that are naturally present in the fibre (37) or through a suitable reflector (not illustrated) at the other end of the fibre (37). Eventually might be present a system to generate pulses also of the "stimulus" radiation, with suitable shape, duration and synchronized time advance with respect to the "pump" pulses so that the reflected "stimulus" pulse crosses the "pump" pulse only at the desired point of the fibre (37).

Figure 5:
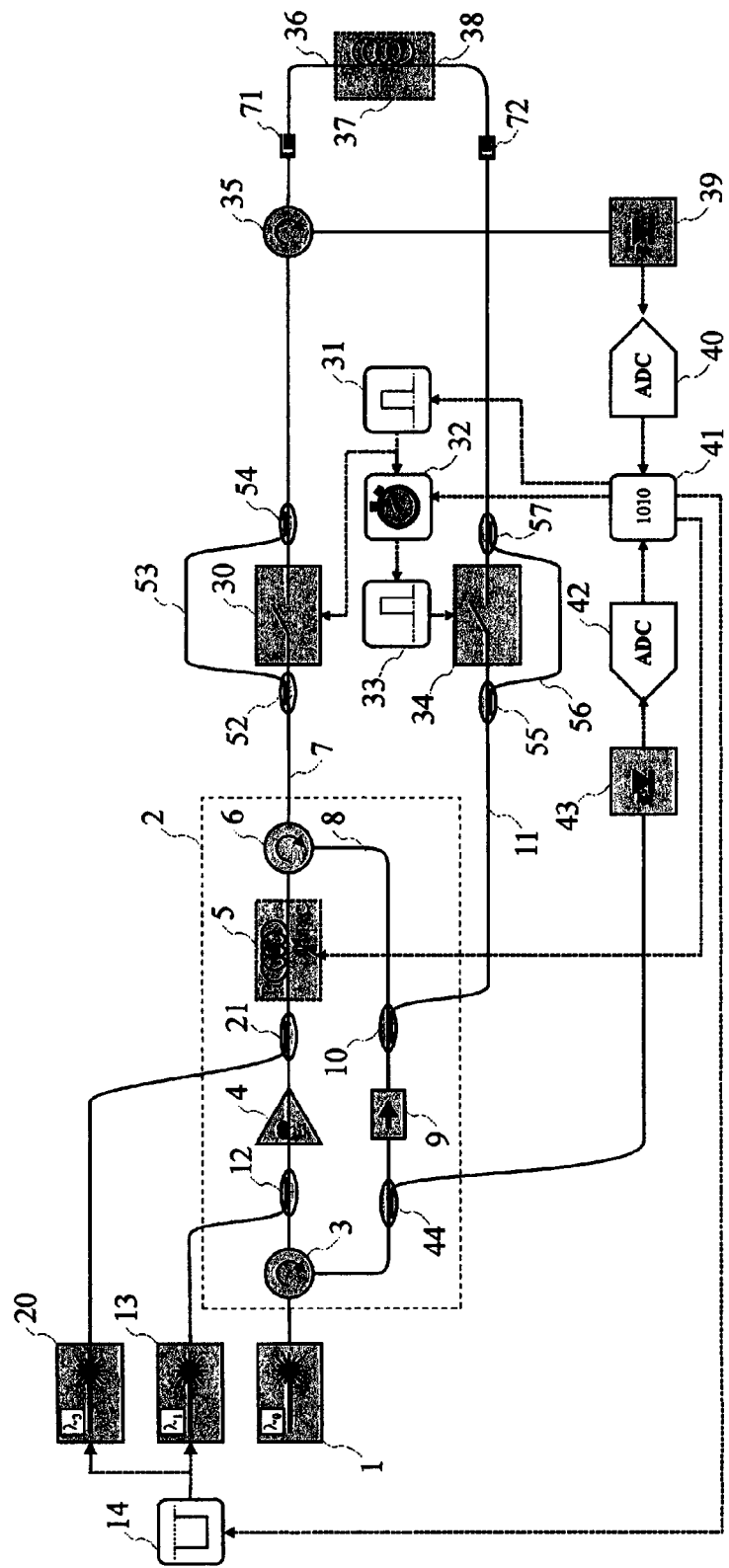
FIG. 5 illustrates a schematic representation, non-limiting, of an embodiment of a BOTDA apparatus according to the present invention that includes means to implement optical pre-pumping of the Brillouin scattering.

FIG. 5 discloses a non-limiting partial schematic representation of a preferred embodiment of a BOTDA partially referable to that of FIG. 3 and in which it has been added the implementation of a technique of optical "pre-pumping" with an embodiment industrially more simple and cheap with respect to the known ones. In addition to what has been already described referring to the FIG. 3, the apparatus of FIG. 5 includes means to turnaround with a suitable amplitude attenuation at least one of the devices for generating optical pulses (30, 34) in the status of interdiction.

The said means of turnaround could for example, even if not necessarily for the protection purposes of the present document, comprise at least one coupler (52, 55) suitable to pick up a fraction of the radiation upstream of at least one of the pulse generation devices (30, 34), at least one turnaround arm (53, 56) suitable to transport the radiation that has been picked up, and at least one coupler (54, 57) suitable to re-inject the radiation picked up downstream of the same pulse generation device (30, 34) without changing the direction of travel. The apparatus according to FIG. 5 will be furthermore characterized by a control logic suitable to generate "Brillouin pump" and "Brillouin stimulus" optical pulses, and that is in a way that the measurement cycle at each different wavelength of the "Brillouin stimulus" is characterized by a first phase during which the generator of "Brillouin pump" pulses (30) is interdicted while the generator of "Brillouin stimulus" pulses is conducting, followed by a transient phase in which the generator of "Brillouin pump" pulses (30) is conducting while the generator of "Brillouin stimulus" pulses (34) is interdicted. This operation mode has the scope of routing into the end (36) of the measurement fibre (37) "optical pump" pulses that propagates in the direction (60) and that are characterized by a leading section with reduced intensity ($A_3$) followed in time by a transient section with higher intensity ($A_4$) and suitable duration, and is furthermore aimed to route into the opposite end of the measurement fibre (37) pulses of "Brillouin stimulus" that travel in the direction opposite to that of the pump pulses and are characterized by a leading section having higher intensity ($A_1$) followed in time by a transient section with lower intensity ($A_2$) of suitable duration, with the scope of stimulating pie-amplification processes of the stimulated Brillouin effect through the resonant exchange between the counter-propagation of anti-Stokes photons and the propagation of Stokes photons.

Figure 6:
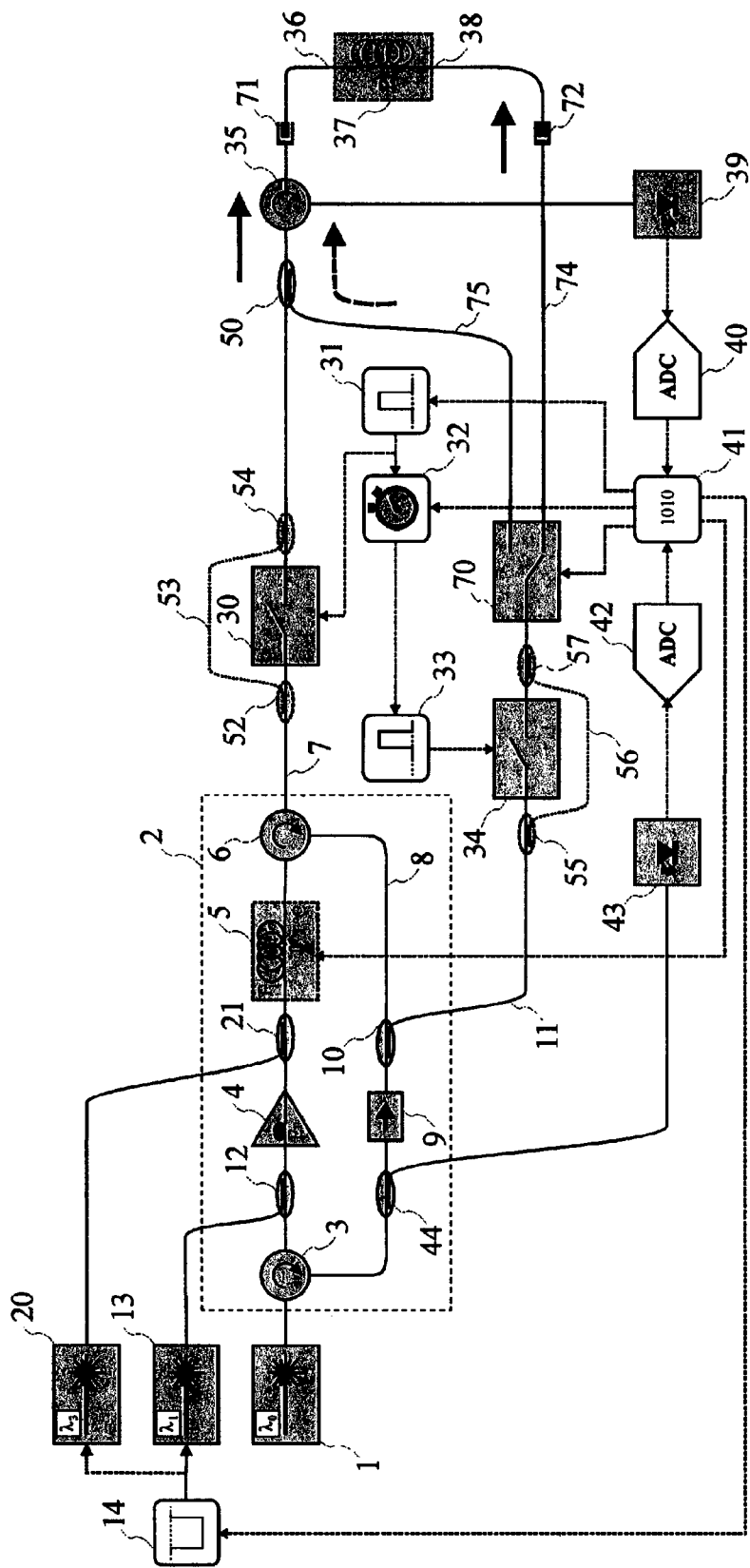
FIG. 6 illustrates a schematic representation, non-limiting, of an embodiment of a BOTDA apparatus according to the present invention that is characterized by being capable to operate whether in "transmission-type" or in "reflection-type" configuration of connection of the sensing fibre.

FIG. 6 discloses a non-limiting partial schematic representation of a preferred embodiment of a BOTDA according to the present invention and characterized by being capable to operate whether in "transmission-type" or in "reflection-type" configuration of connection of the sensing fibre. In addition to what has been already described referring to the figures from 3 to 5, the apparatus comprises at least one optical switch (70) capable to alternatively route at least one between the "pump" and the "stimulus" pulses on different optical paths in order to allow the same apparatus to scan the sensing fibre (37) either in the "transmission-type" configuration or in the "reflection-type" configuration.

Suitably, the apparatus might comprise means to control and/or analyse the polarization of the light. Finally it is clear that modifications and variations can be made to the described device without leaving the scope of protection of the present invention.

What is claimed is:

1. An apparatus for interrogating at least one sensing optical fiber (37) by analyzing the distribution of the wavelength spectrum of the stimulated Brillouin scattering along the length of the said optical fiber (37) characterized by the facts of comprising:

at least one primary source (1) of coherent light characterized by a wavelength $\lambda_0$ and a spectral linewidth not broader than the spectral width of the Brillouin scattering in the sensing optical fiber (37), and at least one ring-type optical circuit (2) that can accept the injection of the light sourced by the primary source (1) and:

a) make available one eventual first light output (7) that is characterized by the same wavelength $\lambda_0$ of the primary source (1), and b) produce, through a process of recirculation and amplification of spontaneous and stimulated Brillouin scattered light, at least one second light output (11) that is characterized by the wavelength $(\lambda_0+\Delta\lambda)$ shifted of a quantity $\Delta\lambda$ with respect to the wavelength $\lambda_0$ of the primary source (1), and at least one tuning system capable to control the wavelength shift $\Delta\lambda$ of the light produced in the ring-type optical circuit (2) by controlling the temperature and/or strain conditions of at least one part of the ring-type optical circuit at which the said Brillouin scattering happens, and to stabilize the said wavelength shift at a value arbitrarily selected at least within the limits required for the desired analysis scope, and at least one optical pulse generation system capable of modifying intensity of at least one of the said light outputs in order to produce pulses characterized by an intensity change between at least two different amplitude levels and having a limited time duration, and at least one light routing system capable of injecting the light and the light pulses into at least one sensing optical fiber (37), according to a configuration that allows stimulated Brillouin scattering phenomena in the sensing optical fiber (37) and capable to route at least part of the light scattered by the said phenomena toward at least one optoelectronic detecting system; and at least one optoelectronic detecting system capable to collect, convert and quantify at least part of the light scattered by Brillouin phenomena happened within the sensing fiber (37); and at least one control and processing system (41) suitable for:
a) driving a tuning system in order to set a proper wavelength shift and, eventually, driving any additional function related to the tuning system, and
b) driving the optical pulse generator in order to generate at least one optical pulse, and
c) getting from the detecting system the quantification of the intensity of the light scattered by Brillouin phenomena in the sensing optical fiber (37), eventually as a function of the time elapsed from the instant of generation of the optical pulses, and
d) reiterating at least part of the sequence of operation listed above in order to test a plurality of values of the wavelength shift properly distributed, and
e) processing the collected information in order to evaluate at least one characteristic of the spectrum of the light scattered by stimulated Brillouin interaction in the sensing optical fiber (37), also as a function of the position along the optical fiber where the interaction happened, and at least one interface capable to allow the control and processing system (41) to communicate exchanging instructions and/or information with an operator and/or with at least one external device.

2. An apparatus according to the claim 1 comprising at least one ring-type optical circuit (2) that is characterized by the fact of comprising:

at least one first directional light routing system (3) capable to accept the injection of light coming from an outside circuit and launching it in a first propagation direction along the ring-type optical circuit (2), and at least one optical amplification (4), for the intensity of the light that circulates in the ring circuit, and at least one guided optical propagation (5) of the light, where spontaneous and stimulated Brillouin scattering are preferentially allowed and at least in the direction of propagation opposite to the said first propagation direction, and at least one light recirculation (8) capable to route at least part of the said Brillouin scattered light injecting it again in the guided optical propagation (5b, 5c) maintaining a propagation direction opposite to the said first direction of propagation, and at least one light extraction (6, 10) that can extract the proper fraction of the light radiations propagating in the ring-type optical circuit and routes them properly on one or more outputs (7,11).

3. An apparatus according to claim 2 comprising, in addition, at least one Brillouin output spectrum purging system (14) acting on the ring-type optical circuit (2) in order to accelerate the quenching of the distortion of the spectrum of the light produced by the ring-type optical circuit consequent to a change of its wavelength tuning.

4. An apparatus according to claim 3 the Brillouin output spectrum purging system (14) acts by temporarily varying the optical attenuation of at least one element in the ring-type optical circuit (2) and/or by temporarily varying the gain of the optical amplification in the ring-type optical circuit (2).

5. An apparatus according to claim 2 the guided optical propagation (5) where preferentially happens the Brillouin scattering in the ring-type optical circuit (2) comprises at least one single-mode optical fiber having high Numeric Aperture (NA) and/or Mode Field Diameter (MFD) below 6 μm at a 1550 nm nominal wavelength, and/or is characterized by chemical-physical alternations that condition the spectrum of the light scattered by Brillouin interactions in the same fiber in order to ensure a better spectral purity even when the fiber is coiled on a non-straight path, and/or characteristics of the Brillouin spectrum that better match those required for analyzing the sensing fiber (37).

6. An apparatus according to claim 2 comprising additional sourcing (20) and injecting (21) in the ring-type optical circuit (2) at least one Raman pump light having nominal wavelength $\lambda_3$ lower than $\lambda_0$ of such a quantity that allows, through stimulated Raman scattering at least in the guided optical propagation (5), a distributed optical intensity amplification for at least one of the others radiations of wavelength $(\lambda_0+\Delta\lambda)$ and $\lambda_0$ that propagates in the ring-type optical circuit (2).

7. An apparatus according to the claim 6 comprising efficiently extracting the Raman pump light from the ring-type optical circuit (2), and routes it into the sensing fiber (37) with the scope of inducing also in the sensing fiber distributed light amplification by stimulated Raman scattering.

8. An apparatus according to claim 1 a sensing fiber (37) is interrogated through the analysis of the stimulated Brillouin spectrum along the fiber length by implementing a transmission type sensor connection in which the lights having wavelengths wavelength $\lambda_0$ and $(\lambda_0+\Delta\lambda)$ are injected at the opposite ends of the sensing fiber (37) one with respect to the other, thus directly realizing a counter-propagating pump-probe stimulated Brillouin scattering configuration.

9. An apparatus according to claim 1 a sensing fiber (37) is interrogated through the analysis of the stimulated Brillouin spectrum along the fiber length by implementing a reflection type sensor connection in which the lights having wavelengths wavelength $\lambda_0$ and $(\lambda_0+\Delta\lambda)$ are both injected at the same end of the sensing fiber (37) with proper intensity and injection mode in order to induce indirectly a counter-propagating pump-probe stimulated Brillouin scattering configuration in the sensor fiber (37).

10. An apparatus according to claim 1 comprising at least one optical switch (70) connect so that it is capable to alternatively route at least one of the output lights (7, 11) on different optical paths in order to allow the same apparatus to scan the sensing fiber (37) either in a transmission type configuration in which both the sensor ends need to be connected to the apparatus, or in a reflection type configuration in which only one sensor end needs to be connected to the apparatus.

\* \* \* \* \*